United States Patent
Xi et al.

(10) Patent No.: US 7,134,349 B2
(45) Date of Patent: Nov. 14, 2006

(54) MICRO-FORCE SENSING SYSTEM

(75) Inventors: Ning Xi, Okemos, MI (US); Yantao Shen, East Lansing, MI (US); Fathi Salem, Okemos, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 84 days.

(21) Appl. No.: 10/886,497

(22) Filed: Jul. 7, 2004

(65) Prior Publication Data

US 2005/0034543 A1    Feb. 17, 2005

Related U.S. Application Data

(60) Provisional application No. 60/485,467, filed on Jul. 8, 2003.

(51) Int. Cl.
    *G01F 3/02*     (2006.01)

(52) U.S. Cl. .................................. 73/862.634

(58) Field of Classification Search ............... 73/105, 73/862.639, 104, 862.634, 103, 579
See application file for complete search history.

(56) References Cited

U.S. PATENT DOCUMENTS

| | | | | |
|---|---|---|---|---|
| 4,588,975 A | * | 5/1986 | Roloff et al. | 338/5 |
| 6,035,694 A | * | 3/2000 | Dupuie et al. | 73/1.38 |
| 6,510,738 B1 | * | 1/2003 | Lee et al. | 73/579 |
| 6,668,627 B1 | * | 12/2003 | Lange et al. | 73/105 |
| 6,720,712 B1 | * | 4/2004 | Scott et al. | 310/339 |
| 2002/0089916 A1 | | 7/2002 | Lee et al. | |

FOREIGN PATENT DOCUMENTS

JP      8-262039      10/1996

OTHER PUBLICATIONS

Qiangxian Huang et al, "Surface Topographic Measurement Using Piezoelectrical PVDF film Stylus", Transactions of the Institute of Electrical Engineers of Japan, PartC Inst. Electr. Eng. Japan, vol. 123-C, No. 3, Mar. 2003, pp. 505-510.

Yantano Shen et al., "Contact and Force Control in Microassembly", Proceedings of the 5th IEEE International Symposium on Assembly NAD task planning, Besancon, France, Jul. 10, 2003, pp. 60-65.

Shan-Min Swei et al., "On Improving Head-disk Interface in Hard Dis Drives Using Active Control", Proceedings of the 39th IEEE Conference on Decision and Contro, Sidney, Australia, vol. 4, Dec. 12, 2000, pp. 3106-3111.

(Continued)

*Primary Examiner*—Jewel Thompson
(74) *Attorney, Agent, or Firm*—Harness, Dickey & Pierce, P.L.C.

(57) ABSTRACT

An improved microforce sensing system is provided. The microforce sensing system includes: a force sensor configured to detect a contact force exerted on a contact tip of the cantilever and operable to generate a signal indicative of the contact force, where the cantilever is constructed from a polyvinylidene fluoride material in the form of a substantially rectangular plate or other suitable shapes; and a processing circuit adapted to receive the signal from the force sensor and operable to determine the contact force exerted on the tip by integrating the signal from the force sensor.

19 Claims, 10 Drawing Sheets

OTHER PUBLICATIONS

Y. Shen, N. Xi, W. Jung Li, J. Tan, "A High Sensitivity Force Sensor for Microassembly: Design and Experiments", Proceedings of the IEEE/ASME International Conference on Advanced Intelligent Mechatronics, vol. 2, pp. 703-708, Jul. 20-24, 2003.

C. K. M. Fung, I. Elhajj, Wen J. Li, N. Xi, "A 2-D PVDF Force Sensing System for Micro-Manipulation and Micro-assembly", Proceedings ICRA '02. IEEE International Conference on Robotics and Automation, vol. 2, pp. 1489-1494, May 11-15, 2002.

Y. Shen, N. Xi, and W.J. Li, "Contact and Force Control in Microassembly" Proceedings of the 5th IEEE International Symposium on Assembly and Task Planning. pp. 60-65, Jul. 10-11, 2003.

C.K.M. Fung, W.J. Li, I. Elhajj, N. Xi, "Internet-Based Remote Sensing and Manipulation in Micor Environment", Proceedings of 2001 IEEE/ASME International Conference on Advanced Intelligent Mechatronics, vol. 2, pp. 695-700, Jul. 8-12, 2001.

* cited by examiner

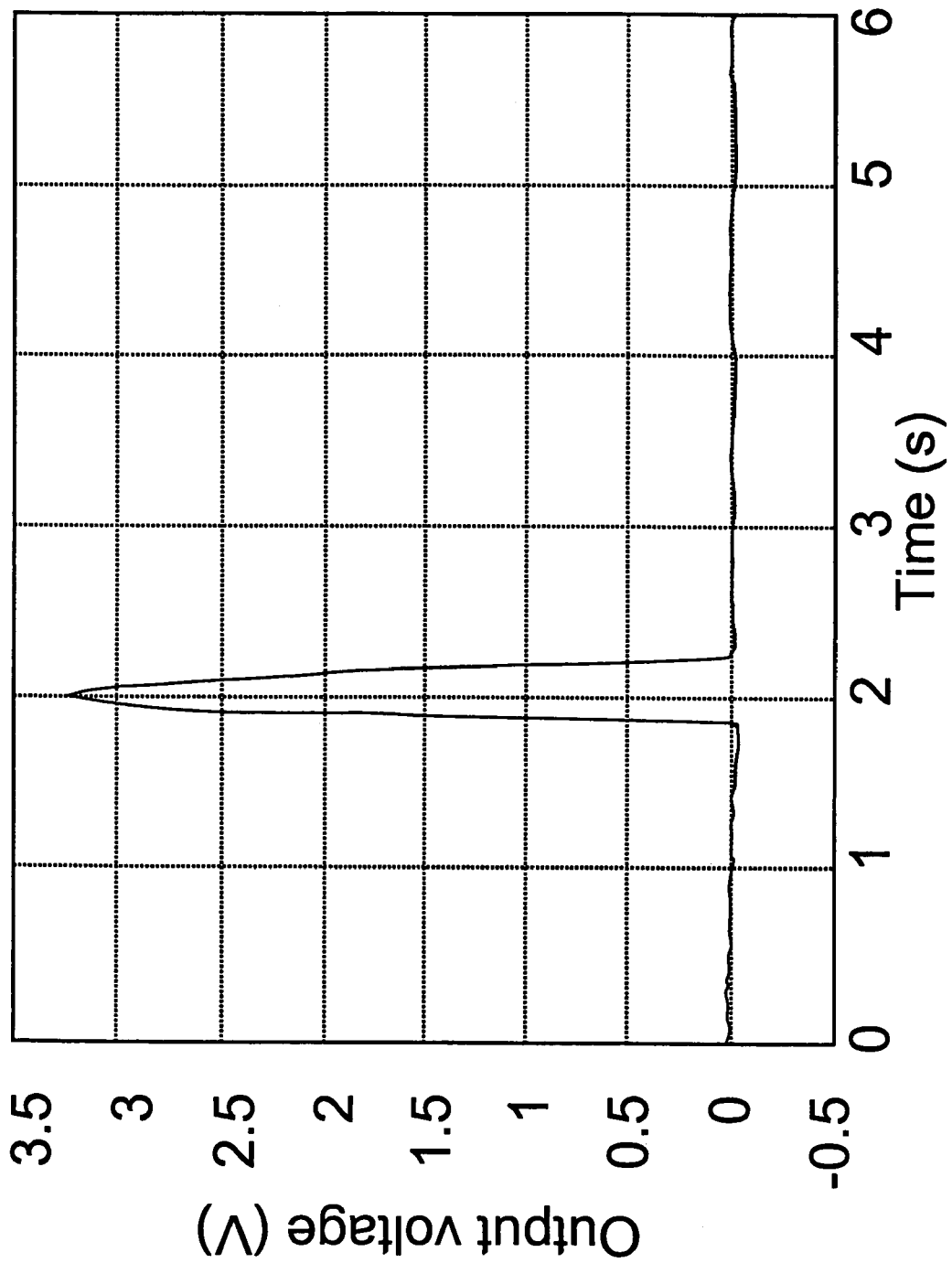

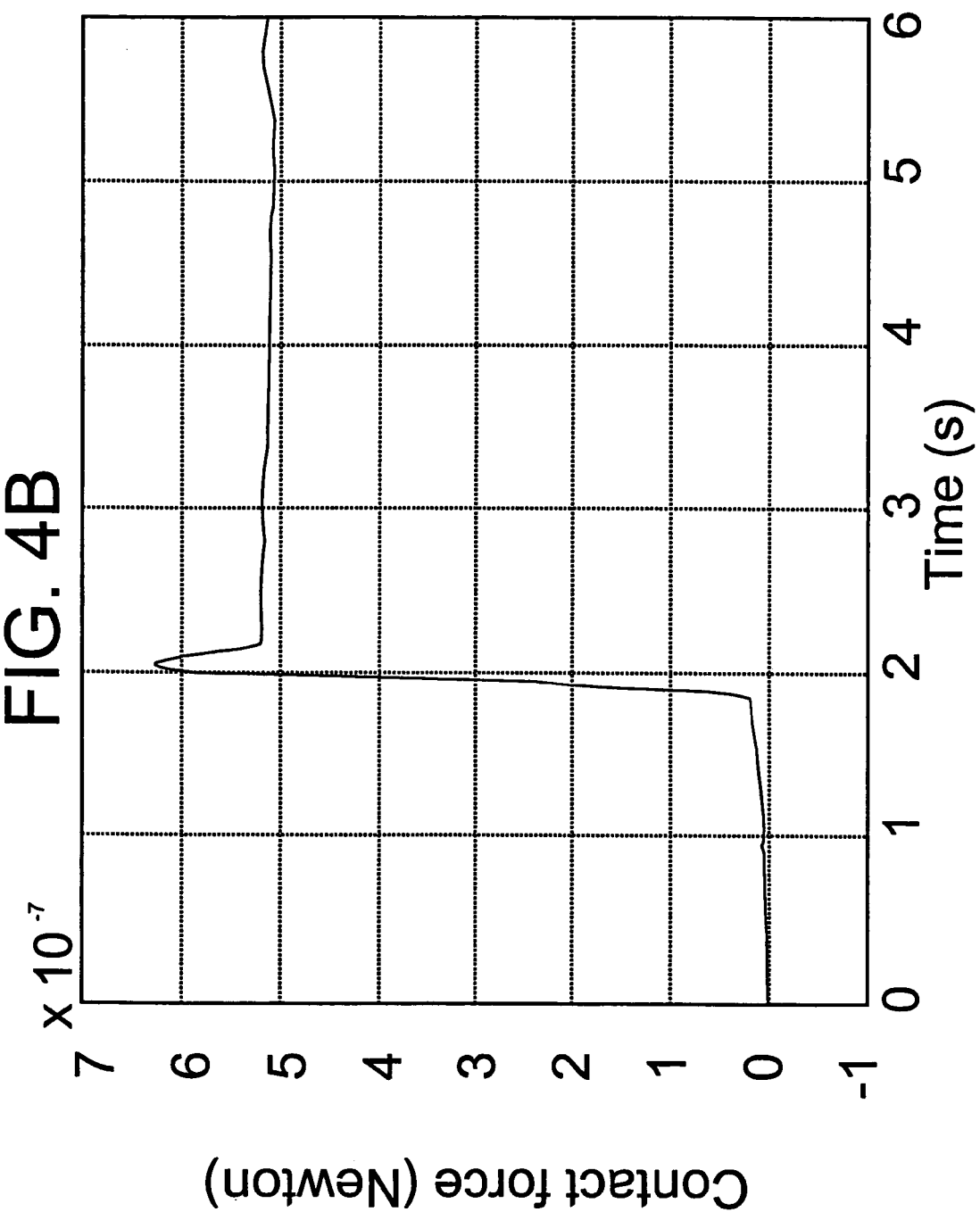

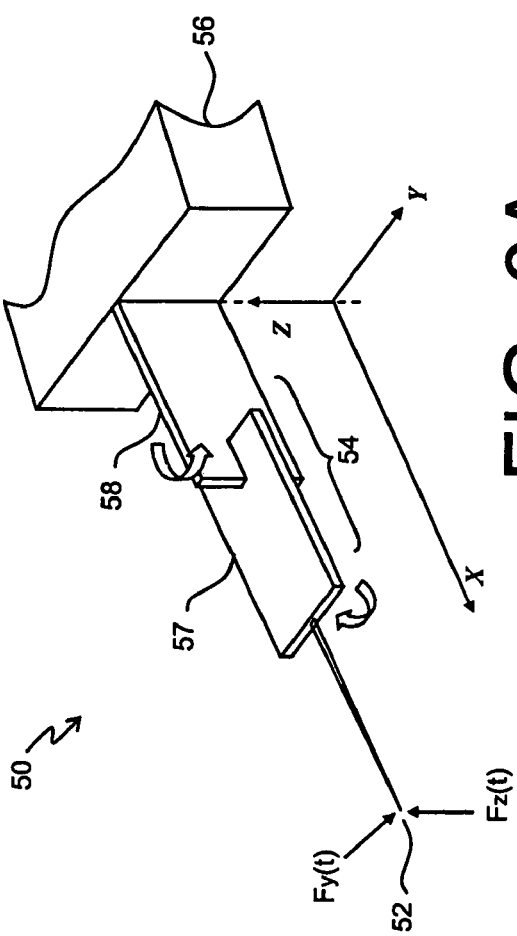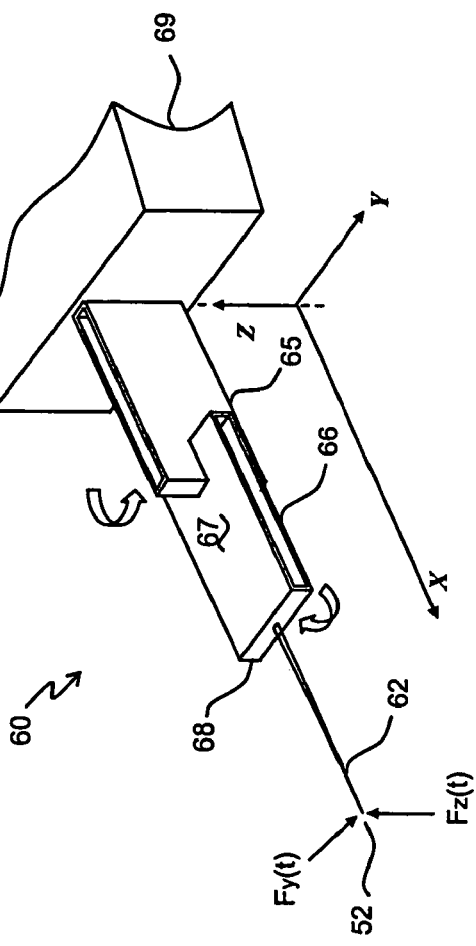

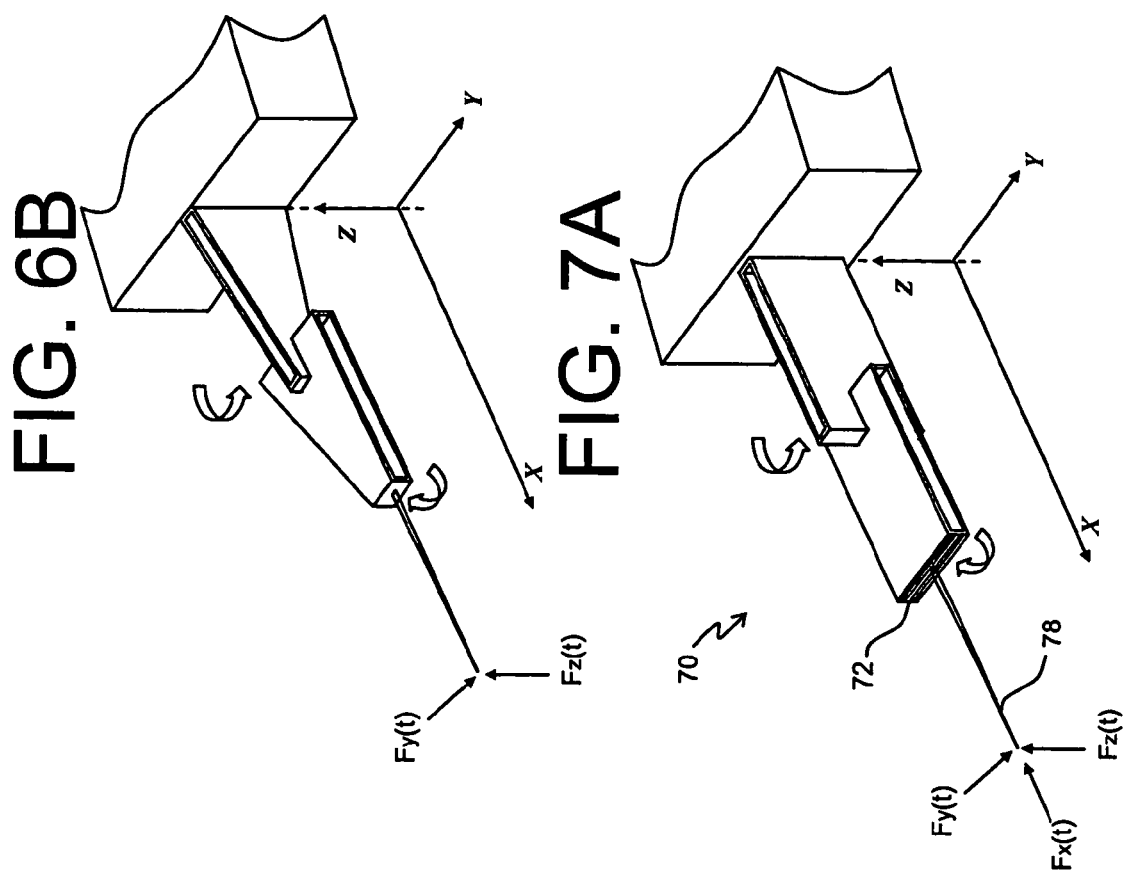

MICRO-FORCE SENSING SYSTEM

CROSS-REFERENCE TO RELATED APPLICATIONS

This application claims the benefit of U.S. Provisional Application No. 60/485,467 filed on Jul. 8, 2003. The disclosure of this application is incorporated herein by reference.

GOVERNMENT RIGHTS

The U.S. Government may have a paid-up license in this invention, and may have the right, in limited circumstances, to require the patent owner to license others on reasonable terms as identified by the terms of Federal Grant No. IRI-9796287 awarded by the National Science Foundation.

FIELD OF THE INVENTION

The present invention relates generally to micromanipulation technology and, more particularly, to a high sensitivity force sensor for use in microassembly.

BACKGROUND OF THE INVENTION

Manufacturing processes which are capable of quickly and cheaply assembling micro-electrical-mechanical systems (MEMS) and other micro-scale devices have not been developed, partly because, at the micro-scale, structures are fragile and easily breakable. They typically break at the micro-Newton ($\mu$N) force range- a range that cannot be felt by a human operator assembling microstructure with tweezers and microscopes, and is not reliably measureable by the existing force sensors during assembly. As a result, it is extremely difficult to manipulate parts for assembly at that scale. Moreover, this situation decreases the overall yield and is driving up the cost of MEMS.

Sensing mechanisms have been developed for use in sensing contact force in microassembly/micromanipulation. For example, strain gauges, piezoresistive effect, piezomagnetic effect and capacitive sensors have been developed, with resolutions in the range of sub-mN or mN. Optical techniques have higher resolution, in the range of nanoNewton (nN), but are more expensive and usually have narrow dynamic range. Mostly, PZT-based (i.e., lead zirconium titanate) piezoelectric force sensors have also been developed. Here, more suitably, the resolution of force sensor based on piezoelectric effect is in the range of $\mu$N generally.

The present invention addresses the development of a PVDF-based micro force sensing system. With respect to PZT-based piezoelectric force sensors, PVDF has excellent sensitivity and better dynamic properties such as low-Q response, an extremely wide frequency, and broad dynamic range and compliance than the commonly used sensor material PZT. Typically, PVDF has low modulus but with a relatively high electromechanical coupling coefficient. Therefore, the piezoelectric polymer PVDF is an ideal force transduction material for developing a high sensitivity micro force sensing system.

Thus, the present invention affords a current feasible and versatile solution in force sensing for microassembly, through the use of PVDF-based force sensor as a sensing device during the process of microassembly. With respect to the PZT-based piezoelectric force sensors, the piezoelectric polymer PVDF is a more ideal sensing device because of its low-Q response, flexible, light weight, ease of use, easy to shape, and high sensitivity. Based on the piezoelectric effect and the mechanics of material for highly sensitive bending cantilever beam structure, the present invention provides both the models and the structures of the 1-D, 2-D and 3-D PVDF high sensitivity force sensors. By equipping the 1-D, 2-D or 3-D PVDF-based force sensors at the front of the micromanipulator, the micro contact force exerted at the sensor tip can be detected and then extracted and amplified by a processing circuit. Furthermore, the processed signals will be fed back to the controller for regulating the contact/impact force to a safety margin on-line during microassembly.

SUMMARY OF THE INVENTION

In accordance with the present invention, an improved microforce sensing system is described. The microforce sensing system includes: a force sensor configured to detect a contact force exerted on a contact tip of the cantilever and operable to generate a signal indicative of the contact force, where the cantilever is constructed from a polyvinylidene fluoride material in the form of a substantially rectangular plate or other suitable plate shapes; and a processing circuit adapted to receive the signal from the force sensor and operable to determine the micron Newton level contact force and force rate exerted on the contact tip by integrating the signal from the force sensor during micromanipulation and microassembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 4A and 4B are graphs illustrating experimental results from the force sensor in accordance with the present invention;

FIG. 5 is a diagram of a two-dimensional force sensor in accordance with the present invention;

FIGS. 6A and 6B are diagrams of two alternative two-dimensional parallel plate force sensor designs in accordance with the present invention;

FIGS. 7A and 7B are diagrams of a three-dimensional parallel plate force sensor in accordance with the present invention.

DETAILED DESCRIPTION OF THE PREFERRED EMBODIMENTS

Figure 1:
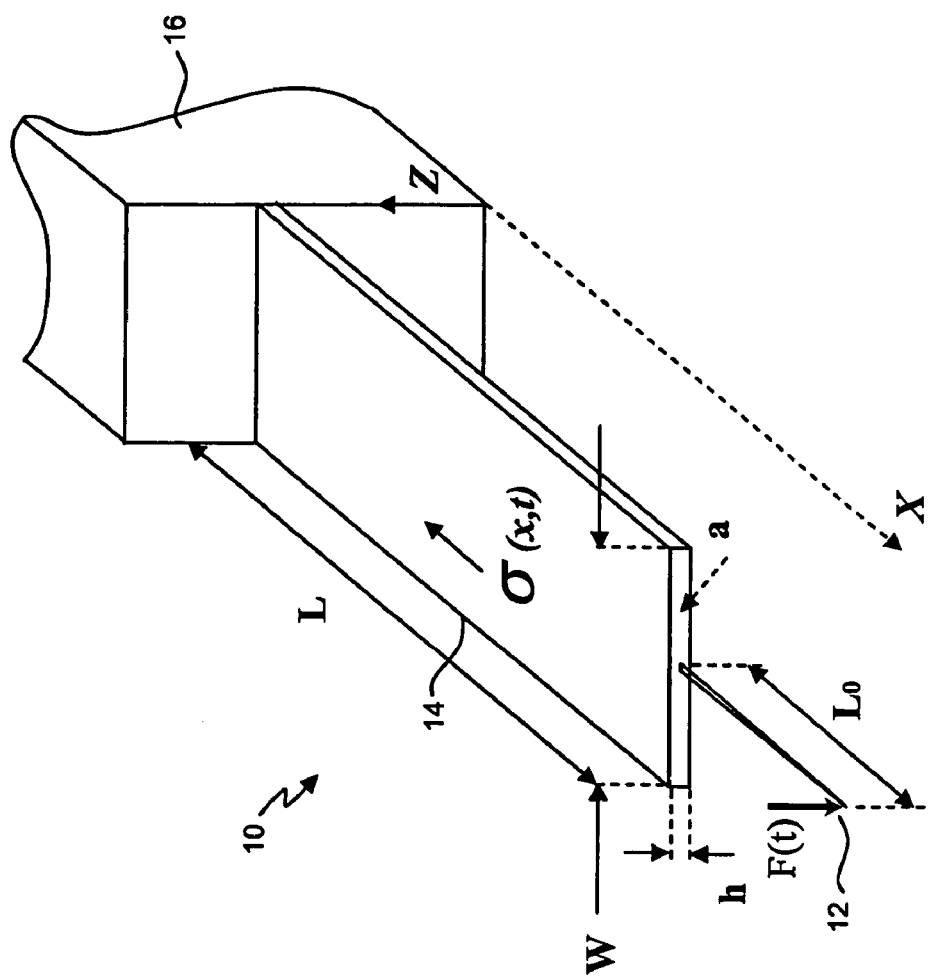
FIG. 1 is a diagram of a one-dimensional force sensor in accordance with the present invention.
Figure 2A:
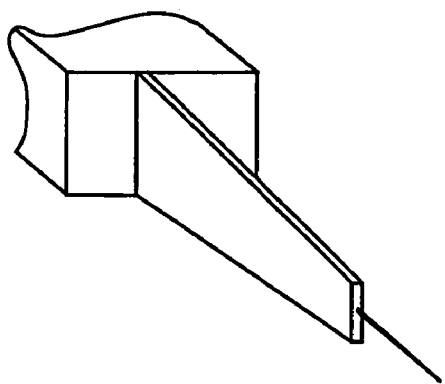
FIGS. 2A–2E are diagrams of a one-dimensional force sensor with the cantilever formed from different shaped plates in accordance with the present invention.
Figure 2B:
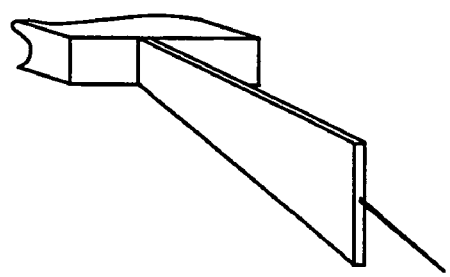
Figure 2C:
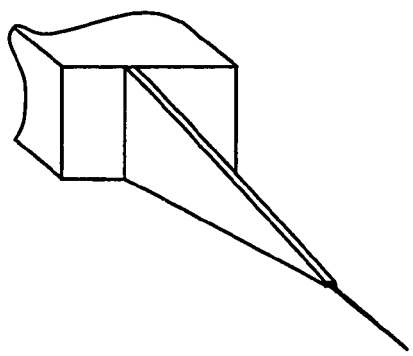
Figure 2D:
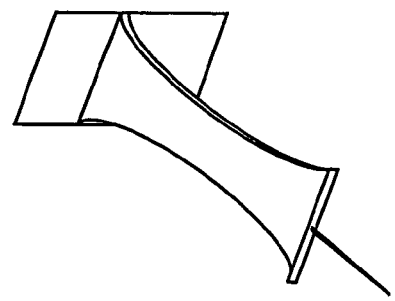
Figure 2E:
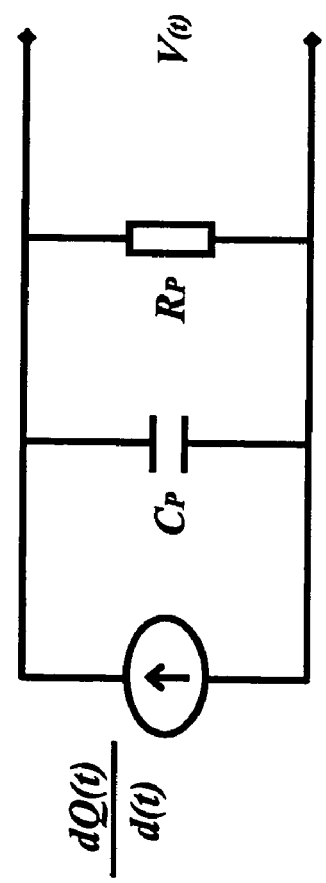

FIG. 1 illustrates a one-dimensional force sensor in accordance with the present invention. The force sensor 10 is comprised of a contact tip 12 which extends outwardly from a cantilever 14 which is in turn coupled to an end of a micromanipulator 16. In a first exemplary embodiment, the cantilever 14 is made from a polyvinylidene fluoride (PVDF) material which is in the form of a rectangular plate or other suitable beam shapes. In operation, the force sensor 10 is configured to detect a contact force and force rate exerted on the contact tip 12 and generate a voltage signal indicative of this contact force and force rate. It is readily understood that the contact tip may have different shapes depending on the applicable micromanipulation task.

While the following description is provided in relation to a cantilever in the form of a rectangular plate, it is readily understood that other plate shapes are also within the scope of the present invention. A few such exemplary plate shapes are illustrated in FIGS. 2A–2E.

Based on the piezoelectric effect and the mechanics of material for bending cantilevers, a one-dimensional sensor model can be developed as further described below. Referring to FIG. 1, parameters of a 1-D physical sensor model are identified as follows: width (W) of PVDF film; thickness (h) of PVDF film; length (L) of PVDF film; surface area (A=L×W); cross-sectional area (a=W×h); length ($L_0$) of contact tip; charger (Q(t)) of PVDF film; voltage (V(t)) of PVDF film; resistance ($R_P$) of PVDF film; capacitance ($C_P$) of PVDF film; contact force (F(t)); inertial moment (I) of the cross-sectional area; unit stress ($\sigma(x,t)$); transverse piezoelectric coefficient ($d_{31}$) of PVDF film; normal dielectric constant ($\in_{33}^T$) of PVDF film; normal electrical field factor ($E_3(t)$) of PVDF film; and normal electric displacement ($D_3(x,t)$) of PVDF film. Without considering the inverse piezoelectric affection and the pyroelectric effects, the unit polarization formula of the PVDF film can be expressed as:

$$D_3(x,t)=d_{31}\sigma(x,t)+\in_{33}^T E_3(t) \quad (1)$$

To sum up the surface area polarization, it gives a charge Q(t) across the PVDF surfaces:

$$Q(t)=\int D_3(x,t)dA \quad (2)$$

Using the mechanics of materials for cantilever beam, the unit stress on the PVDF film is given by $$\sigma(x,t) = \frac{F(t)(L-x)\frac{h}{2}}{I} + \frac{F(t)L_o\frac{h}{2}}{I} \quad (3)$$

where the neutral axis of the bending deflection of beam is assumed to pass through the centroid of the cross-sectional area. Since generation of charge is the same along the width of PVDF, equation (2) can be rewritten as:

$$Q(t) = \int_O^L (d_{31}\sigma(x,t) + \varepsilon_{33}^T E_3(t))W dx \quad (4)$$

$$= \frac{d_{31}Ah\left(L_o + \frac{L}{2}\right)}{2I}F(t) + \varepsilon_{33}^T E_3(t)A$$

Figure 3:
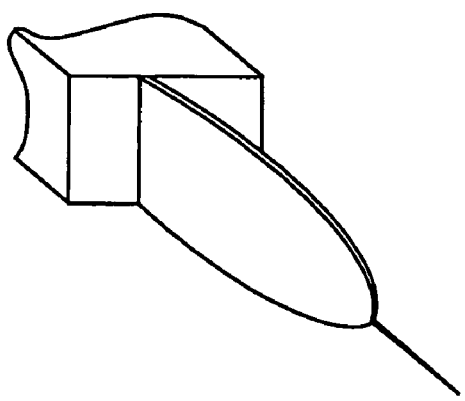
FIG. 3 is a schematic of an equivalent circuit model for the PVDF material employed in the force sensor of the present invention.

By the piezoelectrical effect, if no charge builds up by the external force, the $E_3(t)$ will be zero. This constitutes the effect of the external force. This external force acts upon the PVDF material to generate the charge. The PVDF film can be represented by its electrical circuit behavior is the form of an equivalent circuit model consisting of parallel resistor $R_P$ and capacitor $C_P$, as shown in FIG. 3.

Thus, output voltage V(t) across the PVDF film, can be described by $$\frac{V(t)}{R_P} + \dot{V}(t)C_P = \frac{dQ}{dt}. \quad (5)$$

Since the electrical field is $$E_3(t) = -\frac{dV(t)}{dh},$$

then it is understood that $$E_3(t) = -\frac{V(t)}{h}$$

for a uniform electric field over the very small thickness h and $$\dot{E}_3(t) = -\frac{\dot{V}(t)}{h}.$$

Accordingly, the relationship between contact force rate and the generated voltage may be expressed as follows:

$$V(t)+\lambda \dot{V}(t)=B\dot{F}(t) \quad (7)$$

where $$C_P = \frac{\varepsilon_{33}^T A}{h}$$

is the capacitance of the PVDF film; $\lambda=2R_P C_P$ and $$B = \frac{R_P A d_{31} h\left(L_o + \frac{L}{2}\right)}{2I}$$

are the constants. By the Laplace transformation, a high-pass-filter-like electrical transfer function is given as:

$$T(s) = \frac{V(s)}{F(s)} = \frac{B}{\lambda}\frac{\lambda s}{1+\lambda s}. \quad (8)$$

Preliminary experimental results have shown that the proposed PVDF sensor is highly sensitive and has high resolution. Referring to FIGS. 4A and 4B, it can be seen that the resolution of the force measurement can reach the range of sub-µN for the one-dimensional force sensor described above.

Based on the one-dimensional model, a two-dimensional force sensor is also envisioned as shown in FIG. 5. As noted above, the force sensor 50 is comprised of a contact tip 52 which extends outwardly from a cantilever 54 which is in turn coupled to an end of a micromanipulator 56. However, the cantilever 54 is constructed by arranging two PVDF plate members perpendicular to each other. In an exemplary embodiment, a second rectangular plate 57 extends lengthwise from a first rectangular plate 58 such that a length dimension for the rectangular plates are substantially in parallel with each other and a width dimension for the rectangular plates are substantially perpendicular to each other. In this way, this structure provides a decoupled force measurement in the Y and Z directions, where the decoupled output voltages and force rates can be described as $$V(t)+\lambda_z \dot{V}(t)=B_z \dot{F}_z(t)$$

$$V(t)+\lambda_y \dot{V}(t)=B_y \dot{F}_y(t) \quad (9)$$

Lastly, the contact tip 52 extends outwardly from an outermost end of the second plate 57. It is readily understood that the 2-D sensor may be constructed from plates having different shapes as described.

FIG. 6A illustrates an alternative 2-D sensor 60 based on a parallel plate structure. In this embodiment, the cantilever is comprised of two sets of rectangular plates consisting of PVDF material. The first set of rectangular plates 65 extends lengthwise from a connection point on the micromanipulator 69 as described above. The second set of rectangular plates 66 couples to the first set of plates 65 at a distal end from the connection point to the micromanipulator 69. In particular, a longitudinal surface 67 of the second set of plates 66 extends lengthwise from the first set of plates 65 such that the length dimension of the two plates in the second set is substantially in parallel with the length dimension of the two plates in the first set and the width dimension of the two plates in the second set is substantially perpendicular to the width dimension of the two plates in the first set. In each set, the longitudinal surfaces of the plates are oriented parallel to each other as shown. To attach the contact tip 62, at least one connecting member 68 extends between the two rectangular plates of the second set at an outermost lengthwise end, thereby defining an outwardly facing surface area. The contact tip 62 then extends outwardly from the outwardly facing surface area of the connecting member 68. It is further envisioned that the rectangular plates may be connected at each end as shown in the figure.

The two parallel plate structure improves the rigidity of the sensor and, at the same time, retains the sensitivity of the force sensing to the utmost in that direction. In addition, the two parallel plate structure provides the decoupled force measurement as described above. Again, the two parallel plate structure may be constructed from plates having a different shape. For instance, a parallel plate structure comprised of plates in the form of an isosceles trapezoid is shown in FIG. 6B.

Figure 7B:
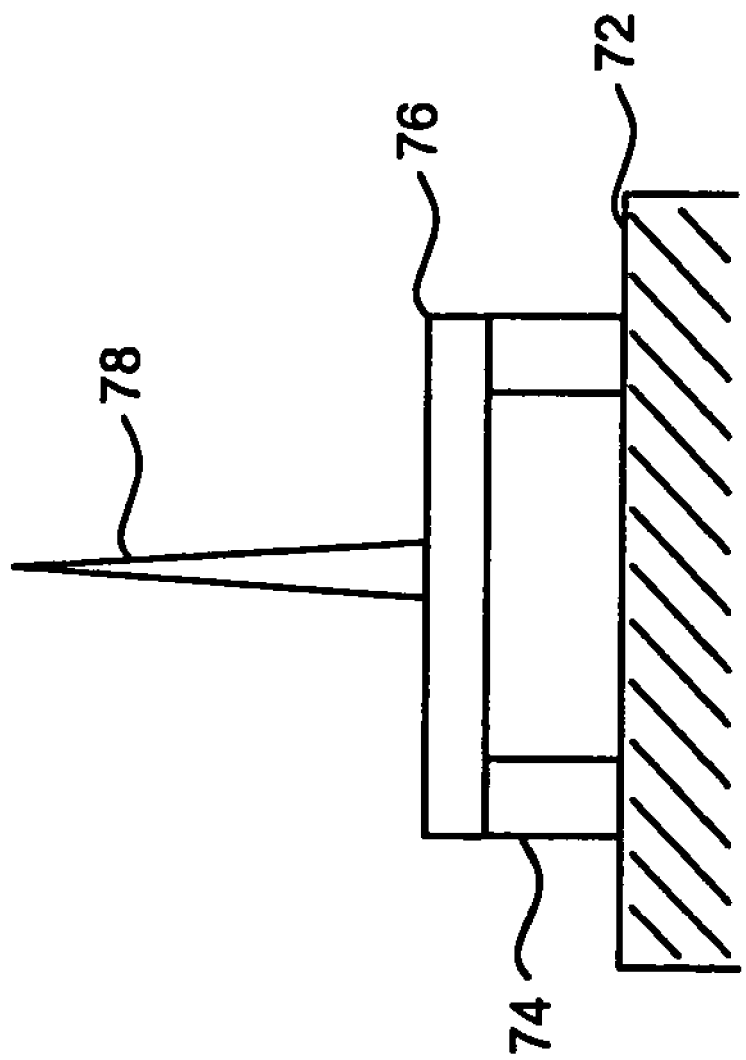

Furthermore, it is envisioned that this 2-D sensor design can be extended to a three-dimensional force sensor 70 as shown in FIGS. 7A and 7B. To do so, an additional slab of the PVDF film is placed on the outwardly facing surface 72 to provide the force measurement in the X direction. Specifically, a pair of rails 74 are mounted to the outwardly facing surface area 72 of the connecting member, and a planar member 76 consisting of a polyvinylidene fluoride material is placed on top of the two rails 74. The contact tip 78 then extends outwardly from the planar member 76 a shown.

In order to determine a force measurement, the force sensor cooperatively operates with a processing circuit. Since the voltage signal output by the sensor is proportional to a rate of change of the force exerted on the contact tip, the processing circuit is designed to process the incoming signal, thereby yielding a signal indicative of the exerted forces. An exemplary processing circuit is set forth below. However, it is readily understood that other circuit configurations are within the scope of the present invention.

Figure 8:
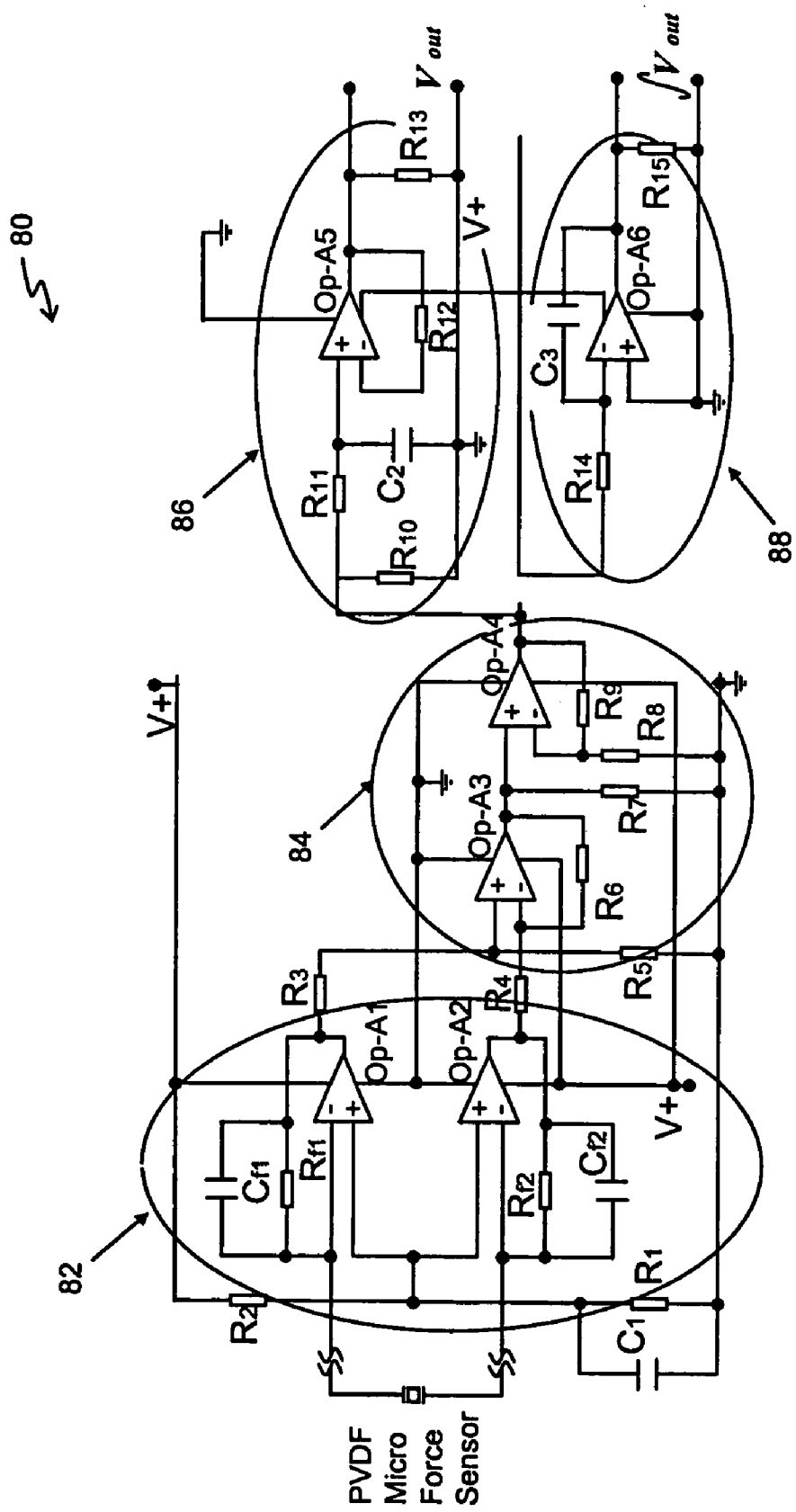
FIG. 8 is a schematic of an exemplary processing circuit for use with the force sensor of the present invention.

Referring to FIG. 8, an exemplary processing circuit 80 is generally comprised of a differential charge amplifier stage 82, a differential-to-single-ended amplifier stage 84, an active low pass filter stage 86, and an integrator stage 88. For example, the differential charge amplifier 82 may be based on the chopper stabilized operational amplifier (e.g. commercial chip TC7650C with a high input impedance $10^{12}$ Ω and low bias current 1.5 pA or ultra-low input bias current operational amplifier AD549 whose bias current is only $60^{fA}$ Max and input impedance is $10^{13}$ Ω).

Following the charge amplifier, a differential-to-single-ended amplifier stage 84 is added. The total differential topology can reduce the common mode noise more effectively. To reject the existing high frequency noises, an active low pass filter stage 86 with a proper cutoff frequency is used before the voltage output. However, it is envisioned that such a low pass filter may instead be positioned as the first stage to connect the force sensor structure. Lastly, the integration of the output voltage in time can also be achieved by an integrator unit 88.

By considering the whole circuit, the transfer function is approximated by $$\frac{V_{out}(s)}{V(s)} + - \frac{2R_f C_p s}{1+R_f C_f s} x - K_c x \frac{1}{1+\tau_1 s} \approx \frac{2K_c C_p}{C_f} x \frac{1}{1+\tau_1 s} \quad (10)$$

where $R_f = R_f = R_f \cdot C_f = C_f = C_f \cdot K_c$ is the gain of the differential-to-single-ended amplifier. $R_f$ should be chosen as a very large value resistor. $\tau_1$ is a rather small time constant of the designed active low pass filter.

From equations (8) and (10), the global transfer function of the sensor system is $$GT(s) - \frac{V_{out}(s)}{F(s)} = \frac{K_c B}{R_P C_f} \frac{\lambda s}{(1+\lambda s)(1+\tau_1 s)} \quad (11)$$

The function is a bandpass type filter. Thus, for force actions with (angular) frequency range between $$\frac{1}{\lambda} \text{ and } \frac{1}{\tau_1},$$

the output voltage of this bandpass filter would be roughly linearly proportional to the force. However, for force action with (angular) frequency content below $$\frac{1}{\lambda},$$

the output voltage would be proportional to the rate of the impacting force. Thus for the latter force frequency range an integration function circuit will be suitable. We note that the parameter λ is determined by the property of the material (PVDF) and the dimensions of the sensor structure. One, thus, can exploit the sensor structure design to achieve an appropriate value of λ suitable for a range of applications where the (angular) frequency bandwidth of the forces encountered is below (or above)

$$\frac{1}{\lambda}.$$

Ideally, however, instead of the low pass filter, one can construct an inverse filter to compensate for the transfer function of the sensor itself (see equation 8). This filter would perform a proportional plus integral function of the voltage of the sensor. Since $\tau_1$ is very small in the circuit, equation (11) can be simply rewritten as $$GT(s) = \frac{V_{out}(s)}{F(s)} = \frac{K_cB}{R_PC_f}\frac{\lambda s}{(1+\lambda s)} \quad (12)$$

By filtering this signal over an appropriate passband and then integrating with respect to time one generates the force rate and the force, over this passband, respectively.

The complete processing circuit can be integrated on a single microelectronic chip which measures the differential voltage across the sensor and provides a filtered version of the force rate and the force. The integrated electronic circuit can achieve the following: (1) low noise processing amplification using low-noise electronic elements designed at the transistor level, (2) high-frequency noise-filtering via low pass filtering, (3) sensor dynamic model compensation, and (4) Principal Component Analysis (PCA) computation to detect the presence and direction of force. This last stage may instead be post computed in software. In addition, the reduction of radio frequency interference and electromagnetic interference needs to be accounted for in the circuit by filtering and shielding. Shielded coaxial cable is important for noise reduction. Moreover, power-supply decoupling and grounding techniques should be employed as well, and the circuit can. provide ESD (electrostatic discharge) protection.

While the invention has been described in its presently preferred form, it will be understood that the invention is capable of modification without departing from the spirit of the invention as set forth in the appended claims.

What is claimed is:

1. A microforce sensing system, comprising:
a force sensor configured to detect a contact force exerted on a contact tip of the cantilever and operable to generate a voltage signal proportional to a rate of change of the force exerted on the tip of the cantilever, the cantilever consisting of a polyvinylidene fluoride material in the form of a plate; and
a processing circuit adapted to receive the signal from the force sensor and operable to determine the force exerted on the contact tip by integrating the signal from the force sensor.

2. The microforce sensing system of claim 1 wherein the plate having longitudinal surfaces which extends lengthwise from a connection point on a micromanipulator.

3. The microforce sensing system of claim 2 wherein the cantilever further comprises a second plate coupled to the first plate at a distal end from the connection point, the second plate extending lengthwise from the first plate such that a length dimension for the plates are substantially in parallel with each other and a width dimension for the plates are substantially perpendicular to each other.

4. The microforce sensing system of claim 1 wherein the tip extends outwardly from and is coupled to the plate at a distal end from the connection point.

5. The microforce sensing system of claim 1 wherein the processing circuit further comprises a differential amplifier circuit adapted to receive the signal from the signal from the force sensor and operable to generate an amplified signal, and a low pass filter adapted to receive the amplified signal and operable to filter portions of the amplified signal above a predefined cutoff frequency.

6. The microforce sensing system of claim 5 wherein the low pass filter outputs a signal proportional to a rate of change of the force exerted on the tip of the cantilever.

7. The microforce sensing system of claim 5 wherein the processing circuit further comprises an integrator adapted to receive the filtered signal from the low pass filter and operable to integrate the signal with respect to time to derive a signal proportional to the contact force exerted on the tip of the cantilever.

8. The microforce sensing system of claim 1 wherein the plate having a shape selected from the group consisting of rectangular, isosceles trapezoid, reverse isosceles trapezoid, isosceles triangle, hyperboles, and tongue-like.

9. A microforce sensing system, comprising:
a force sensor configured to detect a contact force applied to a contact tip extending from a cantilever and operable to generate a voltage signal proportional to a rate of change of the force exerted on the tip of the cantilever, wherein the cantilever being in the form of a substantially rectangular plate that extends lengthwise from a connection point to a micromanipulator; and
an integrator circuit adapted to receive the signal from the force sensor and operable to determine the contact force exerted on the contact tip by integrating the signal from the force sensor.

10. A microforce sensing system, comprising:
a force sensor configured to detect a contact force applied to a contact tip extending from a cantilever and operable to generate a signal indicative of the contact force, where the cantilever includes at least a first set of two substantially rectangular plates consisting of a polyvinylidene fluoride material, the two rectangular plates having longitudinal surfaces oriented parallel to each other; and
a processing circuit adapted to receive the signal from the force sensor and operable to determine the contact force exerted on the tip by integrating the signal from the force sensor.

11. The microforce sensing system of claim 10 wherein the first set of two rectangular plates extends lengthwise from a connection point on a micromanipulator.

12. The microforce sensing system of claim 10 wherein the cantilever is further defined by a connecting member extending between the two rectangular plates at an outermost lengthwise end and defining an outwardly facing surface area, such that the contact tip extends outwardly from the outwardly facing surface area of the connecting member.

13. The microforce sensing system of claim 11 wherein the cantilever further includes a second set of two substantially rectangular plates having longitudinal surfaces oriented parallel to each other and coupled to the first set of two rectangular plates at a distal end from the connection point to the micromanipulator.

14. The microforce sensing system of claim 13 wherein the longitudinal surface of the second set of two rectangular plates extends lengthwise from the first set of two rectangular plates such that a length dimension of the two rectangular plates is the second set are substantially in parallel with a length dimension of the two rectangular plates in the first set and a width dimension of the two rectangular plates in the second set are substantially perpendicular to a width dimension of the two rectangular plates in the first set.

15. The microforce sensing system of claim 14 wherein the cantilever is further defined by a connecting member extending between the two rectangular plates of the second set at an outermost lengthwise end and defining an outwardly facing surface area, such that the contact tip extends outwardly from the outwardly facing surface area of the connecting member.

16. The microforce sensing system of claim 14 wherein the cantilever is further defined by a connecting member extending between the two rectangular plates of the second set at an outermost lengthwise end and defining an outwardly facing surface area, a pair of rails mounted on to the outwardly facing surface area of the connecting member, and a planar member consisting of a polyvinylidene fluoride material extending between the rails such that the contact tip extends outwardly from the planar member.

17. The microforce sensing system of claim 10 wherein the processing circuit further comprises an amplifier circuit adapted to receive the signal from the signal from the force sensor and operable to generate an amplified signal, and a low pass filter adapted to receive the amplified signal and operable to filter portions of the amplified signal above a predefined cutoff frequency.

18. The microforce sensing system of claim 17 wherein the low pass filter outputs a signal proportional to a rate of change of the force exerted on the tip of the cantilever.

19. The microforce sensing system of claim 17 wherein the processing circuit further comprises an integrator adapted to receive the filtered signal from the low pass filter and operable to integrate the signal with respect to time to derive a signal proportional to the contact force exerted on the tip of the cantilever.

* * * * *

UNITED STATES PATENT AND TRADEMARK OFFICE
CERTIFICATE OF CORRECTION

PATENT NO.        : 7,134,349 B2                                            Page 1 of 1
APPLICATION NO.   : 10/886497
DATED             : November 14, 2006
INVENTOR(S)       : Ning Xi, Yantao Shen and Fathi Salem It is certified that error appears in the above-identified patent and that said Letters Patent is hereby corrected as shown below:

Column 5, line 14, first and third occurrence of subscript "y" should be subscript --$\gamma$--.

Column 5, line 63, "a" should be --as--.

Column 7, line 43, "can." should be --can--.

Column 9, line 8, Claim 14, "is" should be --in--.

Signed and Sealed this

Eighteenth Day of December, 2007

JON W. DUDAS
*Director of the United States Patent and Trademark Office*